(No Model.)

G. A. SCHRAM.
GATE LOCK.

No. 251,139. Patented Dec. 20, 1881.

WITNESSES
D. Marrs
W. Webb

INVENTOR
George Ashwell Schram
per atty
Henry Beech.

UNITED STATES PATENT OFFICE.

GEORGE A. SCHRAM, OF ST. THOMAS, ONTARIO, CANADA.

GATE-LOCK.

SPECIFICATION forming part of Letters Patent No. 251,139, dated December 20, 1881.

Application filed October 29, 1881. (No model.)

*To all whom it may concern:*

Be it known that I, GEORGE ASHWELL SCHRAM, a subject of the Queen of Great Britain, residing at St. Thomas, in the county of Elgin and Province of Ontario, Canada, have invented certain new and useful Improvements in Gate-Locks; and I do hereby declare that the following is a full, clear, and exact description of the same, such as will enable others to make and use the same.

My invention consists of a simple form of mechanism whereby a gate is enabled to free itself from its fastening and made afterward to relock automatically. It consists of two concentric arcs, of metal, attached the one rigidly and the other loosely to the gate-post.

Figure 2:
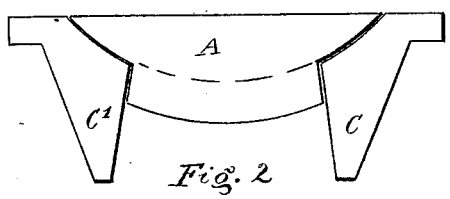
Figure 1:
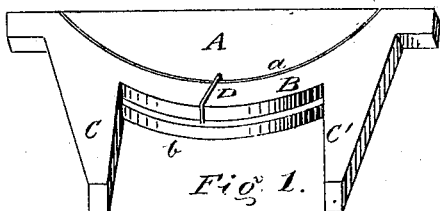
Figure 3:
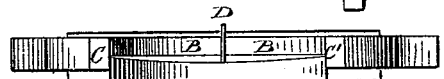
Figure 4:
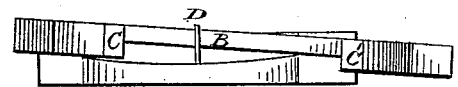
Figure 5:
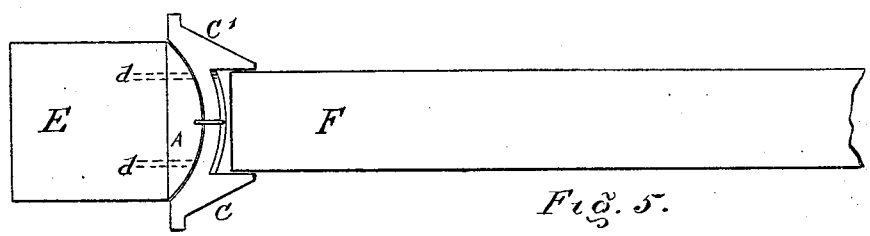
Figure 6:
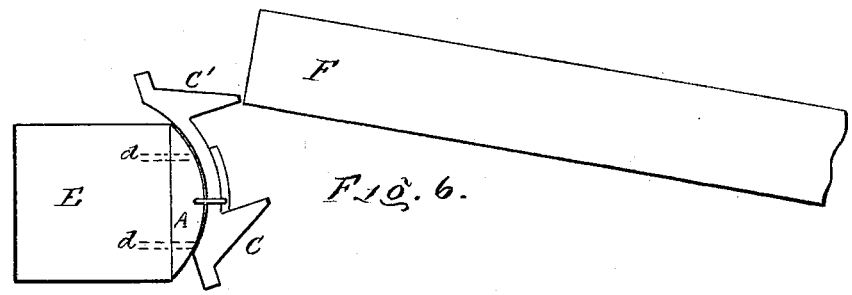

In the accompanying drawings of my invention, Figure 1 is a top view of mechanism closed. Fig. 2 is a view of under side of same, also closed. Fig. 3 is a front view, also closed. Fig. 4 is a similar view open. Fig. 5 shows the same attached to gate post as it appears when the gate is shut. Fig. 6 is a similar view when the gate is opening.

My invention consists of two separate castings. A is one of these castings, curved in front, *a*, and having a projecting curved ledge, *b*, at bottom. On this ledge rests the other casting, B, having also a curved inner face accurately fitting against that of *a* on casting A. It has also two extension pieces or lugs, C C', the use of which will be presently described; and it is held in place on the ledge *b* by the wire guard D, extending from the top of A and bent over to ledge *b*, and inclosing curve B, so as to keep it in position on the ledge while allowing perfect freedom of motion. The casting A is fastened at back to gate-post E by screws *d*, so as to be immovable. The jaws of B (marked C C') are deeper than the thickness of ledge *b*, which lies between them, and consequently they lock the two castings together, as shown in Figs. 1 and 3, by biting against ends of ledge *b*. They will also partially inclose and hold the front of the gate F when shut and keep it locked, as shown in Fig. 5.

When the gate is to be opened the lug C will be slightly raised, so that it lies on top of ledge *b*, as shown in Fig. 4. The gate on being pushed against the other lug, C', causes it to move round with a circular retrograde motion, allowing the gate to free itself, as shown in Fig. 6. In closing the gate it will strike against inner side of lug C, pushing it forward until it reaches the end of ledge *b*, when it will fall down into its former place and lock the gate by the contact of the lugs with the ends of ledge *b*. This ledge is hollowed on top, as shown in Figs. 3 and 4.

I claim as my invention—

The above-described gate-lock, consisting of the circular-faced casting A, having ledge *b* and guard D, attached to gate-post E, and in combination with the casting B, also circular, and provided with lugs C C', for locking the two castings together and confining or releasing the gate F, substantially as shown and described.

GEORGE ASHWELL SCHRAM. [L. S.]

Witnesses:
 WILLIAM WEBB,
 HENRY BEECH.